United States Patent [19]
Gale et al.

[11] 4,348,584
[45] Sep. 7, 1982

[54] FLEXIBLE HEATING ELEMENTS AND PROCESSES FOR THE PRODUCTION THEREOF

[75] Inventors: George M. Gale, Shrewsbury; David I. James, Wem; John V. B. Meyer, Salford, all of England

[73] Assignee: Sunbeam Corporation, Chicago, Ill.

[21] Appl. No.: 148,378

[22] Filed: May 9, 1980

[30] Foreign Application Priority Data

May 10, 1979 [GB] United Kingdom ............... 7916273

[51] Int. Cl.$^3$ .......................... H05B 3/34; H05B 3/54
[52] U.S. Cl. ................................... 219/549; 219/528; 219/541; 219/544; 219/553; 338/22 R; 338/212; 252/511; 264/105
[58] Field of Search ............... 219/212, 504, 505, 510, 219/528, 544, 548, 549; 338/22 R, 22 SD, 212, 214, 217; 29/611, 619; 264/22, 105, 174, 235; 174/106 SC, 107, 120 SC; 252/501, 511

[56] References Cited

U.S. PATENT DOCUMENTS

| | | | |
|---|---|---|---|
| 2,745,944 | 5/1956 | Price | 338/214 X |
| 3,410,984 | 11/1968 | Sandford et al. | 219/212 |
| 3,823,217 | 7/1974 | Kampe | 264/105 |
| 3,858,144 | 12/1974 | Bedard et al. | 338/22 R |
| 3,861,029 | 1/1975 | Smith-Johannsen et al. | 29/611 |
| 4,060,710 | 11/1977 | Reuter et al. | 219/548 |
| 4,074,222 | 2/1978 | Kiyokawa et al. | 338/22 R |
| 4,177,376 | 12/1979 | Horsma et al. | 219/553 |
| 4,200,973 | 5/1980 | Farkas | 29/611 |
| 4,246,468 | 1/1981 | Horsma | 219/553 |
| 4,307,290 | 12/1981 | Bloore et al. | 219/528 |

FOREIGN PATENT DOCUMENTS 2024579  1/1980  United Kingdom ............... 219/528

*Primary Examiner*—Volodymyr Y. Mayewsky
*Attorney, Agent, or Firm*—George R. Clark; Neil M. Rose; Clifford A. Dean

[57] ABSTRACT

A flexible heating element comprises at least two flexible electrical conductors spaced apart by a PTC material, an amorphous highly conductive rubber compatible with the PTC material and adhered to each conductor being interposed between the PTC material and each conductor whereby in use current passes from one conductor to another through the PTC material via the highly conductive rubber. The conductors are spaced sufficiently close to one another to ensure that when energised the PTC material heats substantially uniformly without exhibiting a significant temperature gradient between the conductors and that any abnormal temperature increase increases the temperature of all the PTC material between the conductors in the region of the abnormal temperature increase. The arrangement is such that in use the contact resistance between the conductors and the PTC material is reduced by the amorphous highly conductive rubber interposed therebetween. The flexible heating element is produced by extruding the amorphous highly conductive rubber to cover each flexible electrical conductor and subsequently or simultaneously extruding the PTC material to cover the amorphous highly conductive rubber.

7 Claims, 3 Drawing Figures

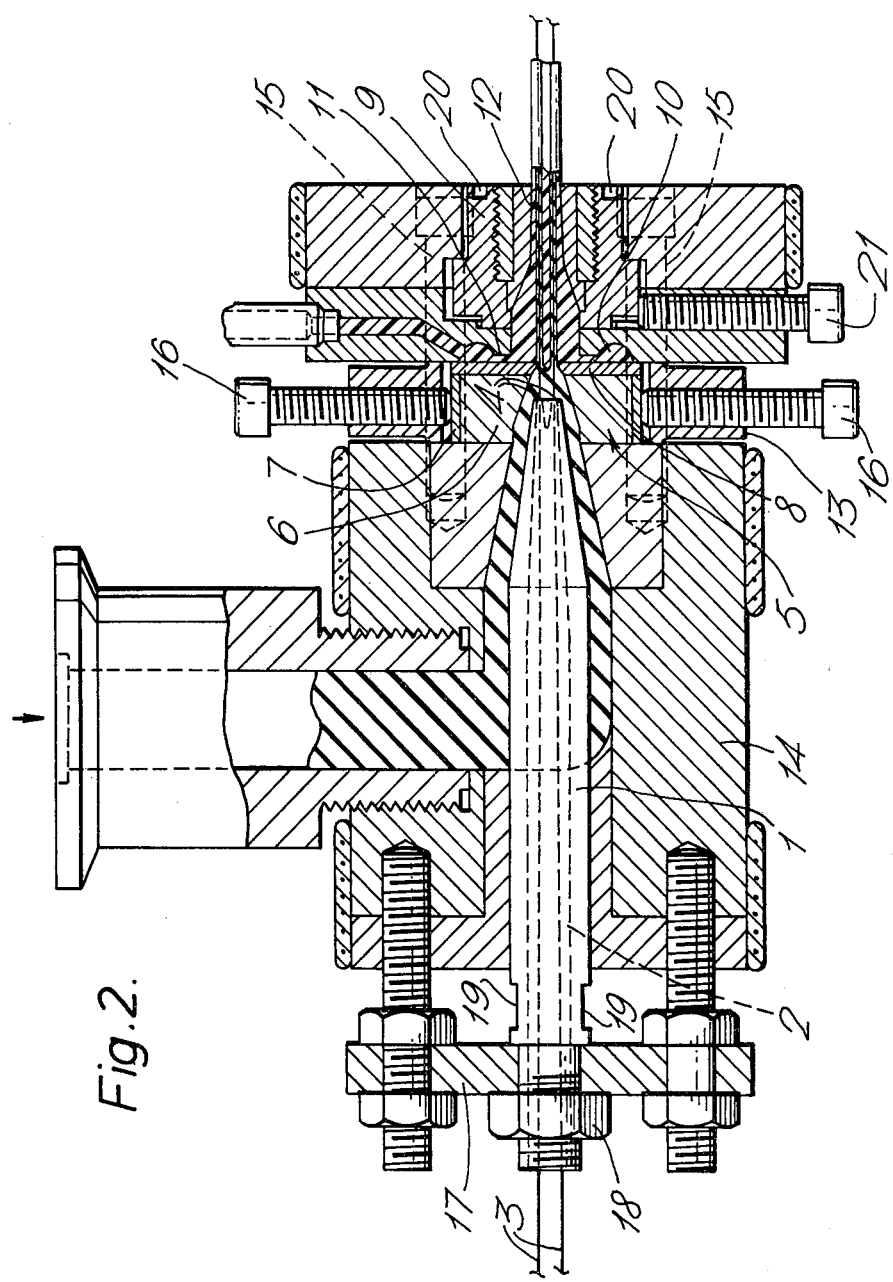

FLEXIBLE HEATING ELEMENTS AND PROCESSES FOR THE PRODUCTION THEREOF

The present invention relates to flexible heating elements and processes for the production thereof. The flexible heating elements are for example suitable for use in electric blankets.

It is common practice in the manufacture of electric blankets to position an electrically conducting heater wire between two fabric layers. Heat from the heater wire passes through the fabric and is dissipated to the body of the user and to the surrounding atmosphere. U.S. Pat. No. 3,410,984 describes an electrically heated bedcover in which localised overheating is prevented by the use of a wire-like heater formed by a pair of conductors separated by a layer of material having a large positive temperature coefficient of resistance. In normal operation of this device substantially uniform heat is generated throughout the device by current flow between the conductors through the positive temperature coefficient (hereinafter also referred to as "PTC") material. When localised overheating occurs, however, the resistance of the material between the conductors increases in that particular region to limit the heat output of that region. The device of U.S. Pat. No. 3,410,984 allows localised overheating to be automatically controlled without the need to disconnect the electric blanket from the power supply.

Two major difficulties are encountered with the electrically heated bed covers described in U.S. Pat. No. 3,410,984. These difficulties relate to the high contact resistance between the conductors and the PTC material due to the difficulty of achieving metal adhesion to common PTC materials and also to the relatively poor stability of the heating element both with regard to the bulk resistance of the PTC material and the resistance at the electrode interface. It is believed that the elevated temperature of operation and temperature cycling cause oxidation and breakdown in the bulk material resulting in an increase in the overall resistance. Such conditions of temperature and temperature cycling can cause an increase in the resistance at the electrode interface due both to breakdown in the already poor adhesion between the electrode and the bulk material and the accelerated oxidation and reaction of the PTC material at the electrode interface. U.S. Pat. No. 3,858,144 attempts to deal with these problems. It thus proposes that the proportion of carbon black in the PTC material at the electrode interface be increased to at least about 1.5 times that of the proportion of carbon black at the mid-point between adjoining electrodes. In addition it is proposed to deploy uniformly, in the matrix or core which electrically connects adjoining electrodes, an effective resistance-stabilising amount of a carboxylic acid group-containing polymer of acid number greater than about 3 or the ammonium, alkali or alkaline earth metal salts thereof.

A large number of process steps are involved in making the articles described in U.S. Pat. No. 3,858,144 and the starting materials used are relatively expensive. Furthermore although resistance stability is improved according to U.S. Pat. No. 3,858,144 the electrically conductive self regulating articles produced do in fact have a relatively short life and there is a need to provide a heating element possessing long term resistance stability and sufficient flexibility for use in electric blankets. Moreover the methods employed in U.S. Pat. No. 3,858,144 result in positive temperature coefficient materials having a diffuse PTC anomaly point giving a linear PTC characteristic over a wide temperature range, rather than a sudden increase at the anomaly point, which makes blanket control more complex.

The present invention is based on the discovery that the deleterious interface effects of poor adhesion and interface breakdown during use may be reduced by providing an amorphous non PTC, highly conductive rubber, between the electrodes and the PTC material. This in addition to providing flexibility promotes both initial and long term adhesion and removes the oxidation sensitive PTC material from the vicinity of the electrode where oxidation effects are most pronounced. The present invention thus overcomes at least in part the disadvantages inherent in the heating elements disclosed in the U.S. Pat. No. 3,858,144 while ensuring that the elements are sufficiently flexible for use in a number of applications including use in electric blankets.

Thus according to one feature of the present invention there is provided a flexible heating element which comprises at least two flexible electrical conductors spaced apart by a PTC material, an amorphous highly conductive rubber compatible with the said PTC material and adhered to each conductor being interposed between the PTC material and each conductor whereby in use current passes from one conductor to another through the PTC material via the said highly conductive rubber, the conductors being spaced sufficiently close to one another to ensure that when energised the PTC material heats substantially uniformly without exhibiting a significant temperature gradient between the conductors and that any abnormal temperature increase increases the temperature of all the PTC material between the conductors in the region of the abnormal temperature increase, the arrangement being such that in use the contact resistance between the conductors and the PTC material is reduced by the amorphous highly conductive rubber interposed therebetween.

The term "highly conductive" as used herein in relation to amorphous non-PTC rubber means rubber which has a sufficiently low resistance to ensure that substantially no Joule heat is generated by the rubber during passage of electricity therethrough. It will be appreciated, however, that the temperature of the amorphous rubber may nevertheless rise as a result of transfer of heat from the PTC material.

Preferred materials for the electrical conductors include copper, especially containing about 1% cadmium, and other low resistance materials such as silver, tin nickel and aluminium and the alloys thereof as well as copper plated with silver, tin or nickel. Such plated copper is especially useful since it promotes stability by providing a fairly inert electrode surface, thus reducing reaction with the PTC material, at a much lower cost than with a pure silver or tin.

The PTC materials for use in the flexible heating elements of the present invention may be solely responsible for the PTC effect or may consist of a combination of materials to provide, for example low contact resistance, flexibility, stability and flame resistance in addition to the necessary PTC behaviour. These materials can be divided into two distinct categories: (1) Active; those materials responsible for giving rise to the PTC effect and (2) Passive; those materials which contribute in no way to the PTC effect, in fact reducing it by their dilutant action but which are compatible physically and electrically with the active components. The active materials employed advantageously include polymers having a glass transition temperature from −125 to −75 deg C. and will in general be based on polymers having a degree of crystallinity such as for example polyolefines, for example high, medium or low density polyethylene and polypropylene as well as ethylene propylene copolymers and terpolymers with non conjugated dienes. Other polymers and rubbers which may be used as an active material include polyvinylidine halides, polyolefin oxides and cross linked silicone rubbers with low carbon black levels. Passive materials employed may be stabilisers, inert fillers or flame retardants and especially rubbers to provide flexibility where such rubbers are compatible with the active material used. With respect to compatibility it will be appreciated that the rubber and the active materials should be capable of combination to form a single phase or if they coexist as two phases they should be bound by forces e.g. intermolecular forces, strong enough to resist physical attempts to separate them. Thus for example if the material is fractured or torn the forces between the rubber and the active material should be sufficient to prevent the fractured surface from distinctly showing one phase standing out and separate from the other phase. Where the rubber and the active material are incompatible the application of even very small stresses tends to cause the incompatible materials to crumble into two distinct and separate phases. The requirement that the rubber and the active material should be compatible is introduced in order to avoid the use of rubbers which substantially degrade the beneficial properties of the active material, it being preferably to use a rubber which improves certain properties, for example, the flex life and flexibility of the active material without affecting the magnitude of the PTC effect and without unduly increasing resistivity except as a result of dilution. Moreover it will be appreciated that the rubber and the active material used should be stable to heat over a long period and thus the rubber used should not substantially decrease heat stability nor should it substantially increase degeneration with time. We have found Butyl rubber to be particularly preferred with respect to the above.

The combination of materials known as the PTC material will conveniently contain carbon black or another conductive filler such as carbon fibres or metallic fibres, flake or powder e.g. silver, copper, zinc etc. Other passive components of the PTC material are for example stabilising agents, inert fillers and/or flame retardants.

In addition to the above there is an interaction beween the bulk PTC material and the conductor e.g. copper at the interface which causes degredation. This interaction is avoided by the introduction of an amorphous non PTC highly conductive rubber between the bulk PTC material and the conductor provided the amorphous highly conductive rubber is compatible with both the bulk PTC material and the conductor. Amorphous non PTC conductive rubbers which may be employed in the flexible heating elements of the present invention between the electrodes and the PTC material include for example certain conductive silicone rubbers and certain chlorinated rubbers such as epichlorohydrin rubber for example containing about 35% ethylene oxide e.g. Herchlor C (65% epichlorohydrin rubber 35% ethylene oxide) as well as Butyl rubber and its derivatives such as chlorinated Butyl rubber. The amorphous non PTC conductive rubbers should be compatible with the PTC material and especially epichlorohydrin rubber should contain preferably a large quantity of carbon black which promotes heating throughout the material and reduces contact resistance.

Epichlorohydrin rubber is especially preferred because we have found it to be particularly compatible with both polyethylene and copper. Thus adhesion is improved and the formation of small air gaps, which become focal points for ionisation and corona discharge is at least in part reduced. We have found epichlorohydrin rubber to be a most conductive rubber while possessing flexibility sufficient to be advantageous, for example, in the preparation of electric blankets.

Such products are relatively easy to make reproducibly and possess long term resistance to temperature, temperature cycling and flexing.

We have found that if a spiralled wire is coated with the amorphous non PTC rubber e.g. epichlorohydrin (e.g. Herchlor C), cured and then the PTC material extruded over the rubber a measurable contact resistance is found. It is preferred therefore to coat the spiralled wire with the amorphous rubber and then to effect extrusion such that curing takes place during extrusion when the contact resistance is much lower. The above-mentioned coating and extrusion processes are effected by co-extrusion.

In a particularly preferred embodiment of the present invention the conductors are coated e.g. dip coated with a colloidal graphite solution and cured. The graphite appears to enter the core providing an increased conductor cross-section and reducing overall resistance. The coating of the core with a colloidal graphite solution improves conductivity and surprisingly does not inhibit adhesion to any significant extent. A coating around the core moreover serves as a barrier to oils migrating from the rubber. In this connection it is believed that the graphite serves as a lubricant and improves contact between the amorphous highly conductive rubber and the electrical conductor by providing an improved contact area as a result of the physical presence of graphite particles. Thus during flexing the bonded amorphous highly conductive rubber layer is intended to deform in shear without the loss of the bond between the rubber and the PTC material whereas the colloidal graphite interlayer is believed to act as a lubricant between the rubber and the electrical conductor allowing movement to take place, contact being established by a purely physical mechanism.

It is important that the conductors be closely spaced with respect to each other for effective operation. In this connection it is important that an abnormal temperature increase increases the temperature of all the PTC material between the conductors in the region of the abnormal temperature increase. A significant temperature gradient between conductors is a characteristic of PTC materials when using long current paths. If the electrical conductors are spaced apart by a great enough distance to allow localised overheating to affect only a portion of the PTC material between the conductors then this portion would experience an increasing voltage drop between the conductors as the resistance increases due to heating and this portion would increase in temperature, possibly to an undesirable extent. Granted this however, the limiting distance between the conductors is probably smaller than would be calculated on the basis of ensuring that localised overheating occurs over the entire cross-section of the PTC material between the conductors. We have found that when a voltage is applied across the conductors then the PTC material heats up uniformly up to a certain critical separation of the conductors. If this is increased all the voltage drop suddenly shifts to a narrow section of the material where intense local overheating and run away occurs. The critical separation is a function of geometry, current density and ambient conditions.

The electrical conductors employed in the present invention may be of any convenient configuration such as for example flat, round, solid or stranded. If desired the surface of the electrical conductor may be nodulated, e.g. microscopically nodulated, to improve adhesion and reduce contact resistance. In this connection it is advantageous to use an activated conductor surface e.g. a highly oxidised surface to improve adhesion.

According to an especially preferred embodiment of the present invention the flexible heating element is of substantially dumb-bell or dog-bone cross section wherein a flexible electrical conductor spiralled around a core is positioned in each head of the dumb-bell or dog-bone.

The flexible heating element preferably has an electrically insulating layer over the positive temperature coefficient material, such layer being intended to confine and retain the shape of the PTC material during annealing temperatures at which the PTC material might otherwise tend to flow or deform. Suitable materials for performing these insulating and retaining functions are polyurethane, cross linked polyethylene, and thermal plastic rubber. Materials which include plasticizers which might migrate into and chemically alter the PTC copolymers should be avoided.

When producing flexible heating elements in the dumb-bell or dog-bone configuration the conductors are spiralled around a core. Thus, for example, the conductor may be wound around a core of for example glass fibre. It has been found that heating elements in the dog-bone configuration with a spiralled core (i.e. with the conductor wound around a core) possess good flexibility when compared with flexible wires described in the literature and are thus of particular interest in fields where flexibility of wire is essential. Flexible heating elements having the dog-bone configuration with a spiralled core are thus of particular interest for use in electric blankets. We have found that wires wrapped around a core may have a tendency to curl up as a result of the stresses produced by the wrapped conductors. In a preferred embodiment of the present invention the conductor wire is wrapped around one core in one direction and around the other core in the opposite direction or a back twisting procedure may be employed. Alternatively both procedures may be adopted. This preferred embodiment enables the tendency for the wires to curl up, to be substantially reduced. Moreover when the conductor wires are wrapped around each core in the same direction without back twisting, it has been found that the twisting of wire causes the two conductors on their cores to come together during extrusion of the dog-bone configuration resulting in varying resistance values over the length of the heater element. The last-mentioned preferred embodiment avoids, at least in part, this disadvantage.

In a particularly preferred embodiment the conductors are coated e.g. dip-coated with a colloidal graphite solution and cured. As stated above the graphite appears to enter the core portion providing an increased conductor cross-section and reducing overall resistance.

In operation of the heater element of the present invention current passes from one conductor to the other through the positive temperature coefficient material via the conductive rubber. The voltage applied to the conducting rubber surfaces allows them to dissipate the desired quantity of heat. If localised overheating occurs anywhere along the length of the wire then the PTC material increases in resistance thereby reducing the voltage of the conducting rubber conductors which in turn reduces the heat dissipated.

A specifically preferred embodiment of the flexible heating element of the present invention in dog-bone configuration is hereinafter described with reference to the accompanying drawing.

According to a further feature of the present invention there is provided a process for producing a flexible heating element as hereinbefore defined which comprises extruding the amorphous highly conductive rubber to cover each flexible electrical conductor and subsequently or simultaneously extruding the PTC material to cover the amorphous highly conductive rubber.

The present invention also relates to a method of producing a flexible heating element in the dog-bone configuration as well as to apparatus therefor.

In a preferred embodiment of the process of the present invention the extrusion is effected using a die comprising means for feeding two spaced-apart, flexible electrical conductors through the die, means for extruding an amorphous highly conductive rubber to cover each of the said conductors, and means for extruding a positive temperature coefficient material so as to cover said rubber and to fill the space between the conductors. Preferably the die is provided with means for adjusting the relative orientation and/or position of guide means for the conductors, a die head for the rubber and/or a die head for the positive temperature coefficient material.

In a further preferred feature, at least part of a die head for the rubber is made of a heat insulating material which is, however, capable of withstanding the extrusion temperatures, such as nylon polytetrafluoroethylene or asbestos based compositions. The use of such a material prevents heat from the positive temperature coefficient material from heating the rubber to undesirable temperatures at which prevulcanisation of the rubber tends to occur. Alternatively or in addition, air gaps may be arranged between the two die heads.

The positive temperature coefficient material is preferably supplied from an extruder to an annular chamber connected by an annular passage to the respective die head, whereby a uniform distribution of the material is obtained.

We have found that it is important to make a careful choice of carbon blacks if the required electrical conductivity is to be achieved without affecting flexibility and flex life. In fact it is possible to select different carbon blacks in order to give the desired result, different types of carbon black having very different effects on the resistance and the PTC characteristics of the heater element. Certain carbon blacks, for example, exert such a substantial affect that even a small amount will modify the resistance of the heater element considerably. Thus while theoretically a single carbon black could be used we have found it especially advantageous to dilute the effect of one carbon black with another type of carbon black or other types of carbon blacks. The mixing of carbon blacks has resulted in improved reproducibility and has been described in Polymer Engineering Science, June 1978, Vol 18, No. 8 pages 649-653 and in Journal of Applied Polymer Science, Vol 22, 1163-1165 (1978). We have found in our own experiments that mixtures of Vulcan P (moderately conductive carbon black) and Ketjen EC (highly conductive carbon black) have proved to be especially advantageous.

After extrusion of the PTC material through the extrusion die it is found that the PTC material possesses a very high resistance. It is therefore important to effect annealing in order to reduce the resistance of the PTC extrudate. Annealing may be effected either by heating the material above its melting point for a short period or by heating the material to just below its melting point for a longer period. Heating of the material above its melting point requires the provision of a jacket to prevent flowing and distortion of the PTC material.

It has been found important to anneal at the correct temperature if optimum resistance requirements are to be obtained. In certain circumstances annealing may result in anomalous resistance characteristics with varying temperature. Thus, for example, it has been found that annealing at an incorrect temperature may result in a PTC material with a room temperature resistance after heating to the anomaly point which is much lower than the room temperature resistance after annealing.

Where the active material is a HD Polyethylene and the PTC element comprises polyethylene, butyl rubber, carbon black and at least 3 phr of antioxidant we have found the preferred annealing temperature to be 130° C.

An antioxidant is generally employed in the formulation of the heater element and this substance may have a profound affect on annealing behaviour. Thus, for example, we have found that if very large quantities of an antioxidant are used the resistance of the element may be reduced on annealing whereas if smaller quantities of the antioxidant are used the resistance of the element may increase on annealing if the annealing is not conducted at the optimum temperature. It therefore appears that there is an antioxidant level above which no rise in resistance with low temperatures is observed. A preferred antioxidant for use with the present invention is 2,5-ditertiary amyl hydroquinone (e.g. Santovar A), and the antioxidant level above which no rise in resistance with low temperatures is observed for this compound is about 3 phr to 5 phr.

The present invention will now be illustrated by way of example with reference to the accompanying drawings.

Figure 1:
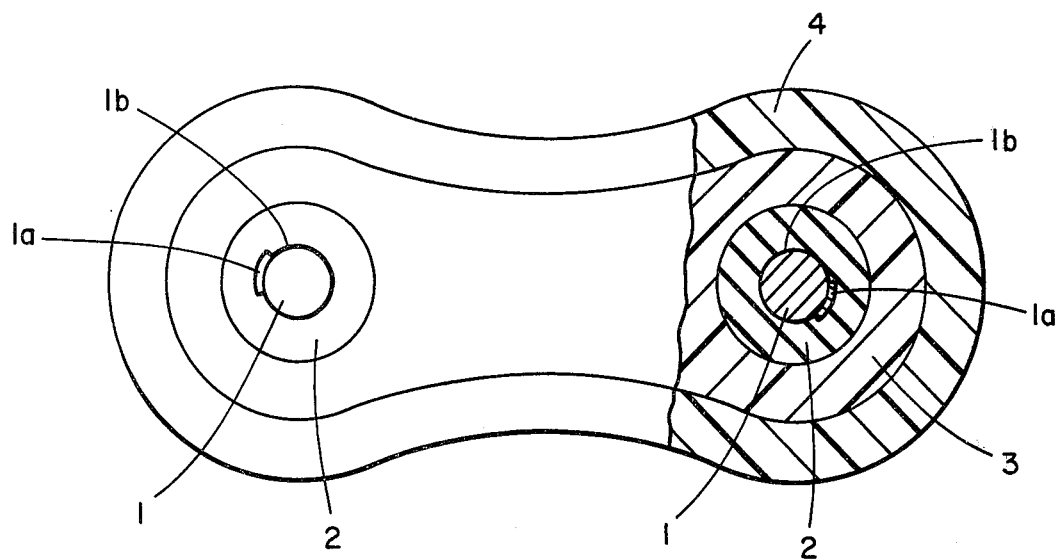
FIG. 1 shows a cross-section through a heating element of the present invention having the dog-bone configuration.
Figure 1A:
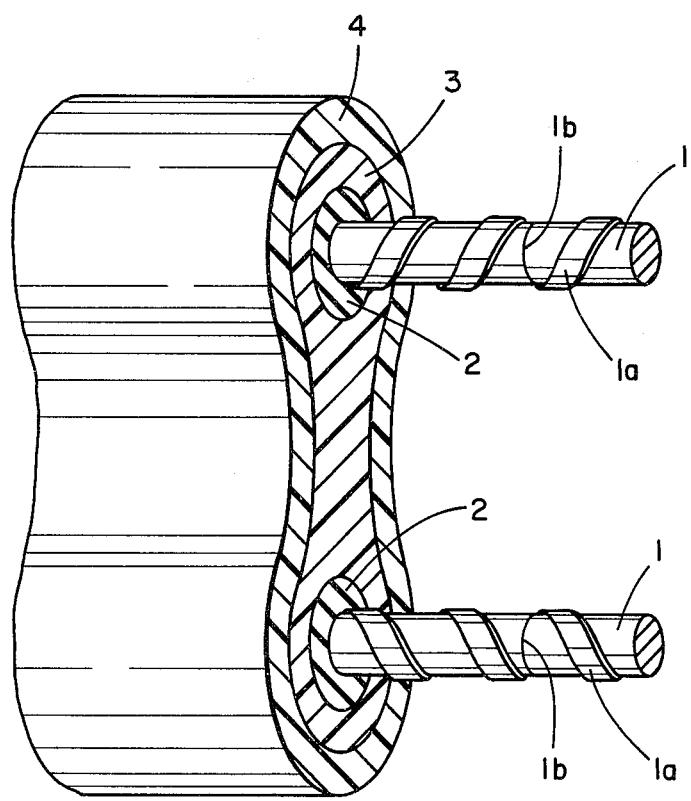
FIG. 1A shows a side view of heating element of FIG. 1.

In FIG. 1 the graphite (DAG) coated spiralled copper conductor 1a on core 1 is surrounded by a non-PTC conducting rubber 2 which serves to reduce contact resistance. The graphite coating on the copper conductors 1a and cores 1 is indicated by reference numeral 1b in FIG. 1A. Each conducting rubber extruded conductor is incorporated in opposite ends of a dog-bone shaped positive temperature coefficient polyethylene material 3 which serves as a self-limiting heater and this material is surrounded by TPR insulation 4. The terms dog-bone and dumb-bell shaped are used to describe the cross-section of the heating element having the enlarged lobes or heads enclosing the conductors and having a narrow web interconnecting these enlarged portions. This terminology is used in the claims to describe the shape having the outwardly displaced lobes connected by a web of less thickness than the lobes.

Figure 2:
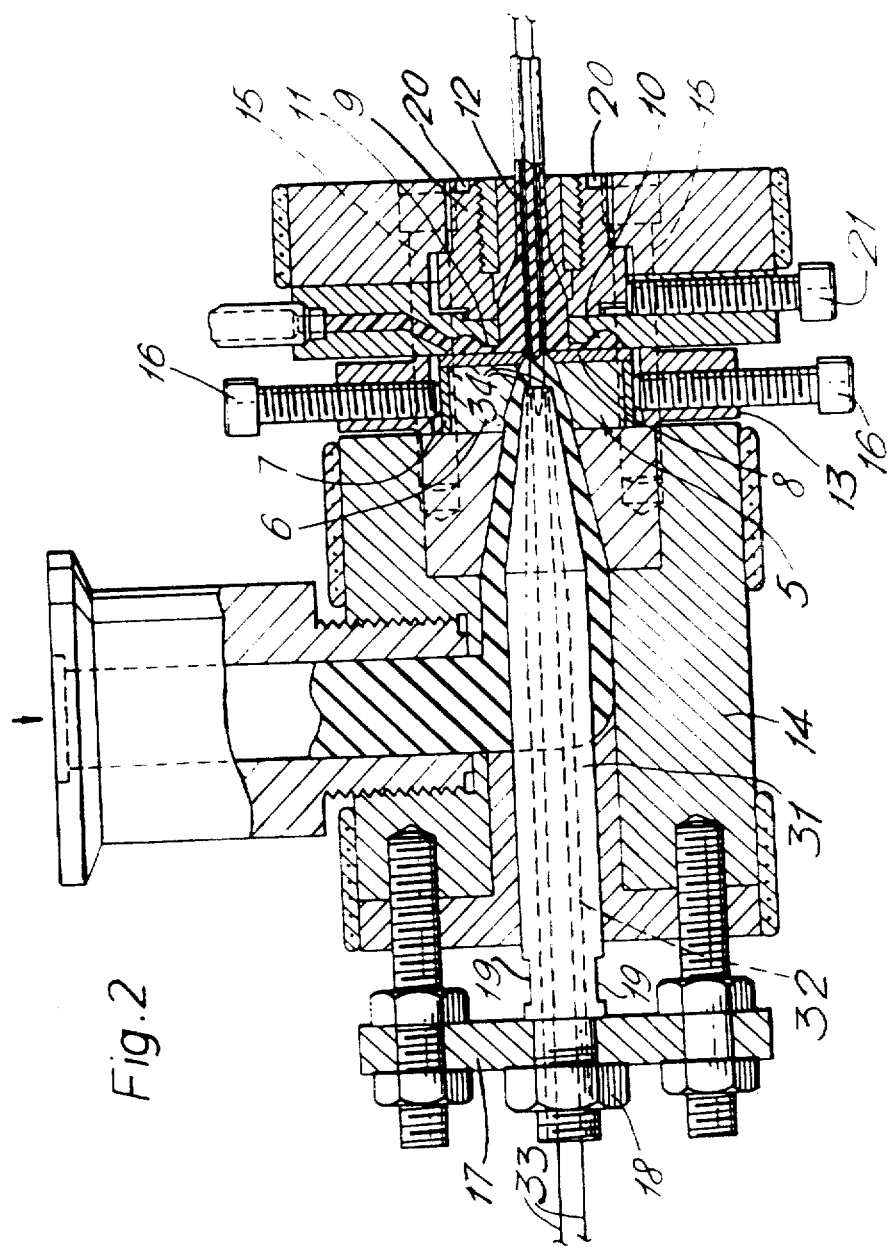
FIG. 2 shows a longitudinal cross-section through a preferred embodiment of a die of the present invention.

As shown in FIG. 2, a die according to the invention comprises a mandrel 31 having an aperture 32 extending the length thereof, through which are fed two spread-apart, flexible electrical conductors 33. The aperture 32 terminates in two separate apertures 34 for maintaining the desired spacing of the conductors. An amorphous conductive rubber is supplied to a first die head 5 by a first extruder (not shown) after flowing around the mandrel 31. The die head 5 comprises a cylindrical member 6 made of a material having a low thermal conductivity, such as nylon polytetrafluoroethylene or asbestos based compositions. The member 6 is surrounded by a protective steel ring 7 and is provided with a steel die plate 8 having two apertures therethrough, whereby as each of the conductors 33 passes through the die plate 8, it is coated with the rubber.

A second extruder (not shown) supplies a positive temperature coefficient plastics material to a second die head 9. The plastics is supplied first to an annulus 10, whereafter it flows through a narrow annular channel 11 into the die head 9. By virtue of this arrangement, the plastics material is distributed uniformly about the axes of the wires 33. The wires, together with the co-extruded rubber and plastics material leave the die head 9 through a "dog-bone" shaped aperture 12, so that the plastic surrounds the rubber-coated conductors and fills the space between the conductors.

An annular member 13 surrounds the die head 5 and is secured to a body member 14 by means of a plurality of bolts 15. Four adjusting bolts 16 extend through the member 13 for adjusting the position of the die head 5 relative to the body member 14. The mandrel 31 is mounted to the body member 14 by means of a plate 17 bolted to the body member 14, so that the position of the mandrel relative to the body member 14 is adjustable. The mandrel is further rotatable relative to the plate 17, by loosening a nut 18 and rotating the mandrel by means of flats 19. The die head 9 is rotatable by means of a tool which fits into two recesses 20, whereby the dog-bone shaped aperture 12 can be aligned with the rubber coated conductors. Finally, concentricity between the die head 9 and the coated conductors is adjustable by means of a plurality of bolts 21.

The following Examples illustrate the production of heater elements according to the present invention:

EXAMPLES

Heater elements of dog-bone configuration suitable for use in electric blankets are produced as follows:

1. Wire

Tinned copper strip or ribbon is wound round a glass core in one direction to give a spiralled core. Tinned copper strip or ribbon is also wound round another glass core in the opposite direction to that employed for the first spiralled core to give two spiralled cores suitable for positioning in opposite heads of the dog-bone configuration.

Each spiralled core is dip-coated using a solution of colloidal graphite in ethanol (DAG 508).

2. Extruded heater element

The two spiralled cores having the tinned copper strip or ribbon wound in opposite directions are fed into the apparatus of the present invention specifically described herein. The amorphous conductive rubber applied to the first die head (5) by a first extruder is an epichlorohydrin rubber (Herchlor C). The PTC materials applied to the second die head (9) via the second extruder are set out in the following table, in which all parts are parts by weight:

|  | A | B | C |
|---|---|---|---|
| Vestolen Type No. A 554 | — | 100 | 100 |
| Alathon No. 7030 | 100 | — | — |
| Polysar butyl type No. 301 | — | 40 | 40 |
| Santovar A | 1 | 1 | 1 |
| Ketjen EC | — | 4 | 4 |
| Vulcan P | 26 | 9 | 13 |

The ingredients of each of the PTC materials were mixed together as follows prior to introduction to the second extruder:

The temperature of a Banbury mixer was raised to 150° C. and the Vestolen Type No. A 554 or Alathon No. 7030 were added to the mixer together with Santovar A and, where appropriate, the Polysar butyl type No. 301. The mixer was run until the stock reached 120° C. and the time was noted. The carbon blacks (Ketjen EC and Vulcan P) were then added and the clock reset to zero. The mixer was run until the temperature reached 150° C., at which point the steam was turned off and cooling water turned on. Mixing was then continued for ten minutes from the time of adding the carbon blacks and the chart temperature noted. The mix was then dumped and the temperature of the stock taken with a needle pyrometer. Mixing was then continued for a further ten minutes on a mill at 170° C.

The three different PTC mixes A, B and C were then introduced in turn into the above-mentioned co-extruder of the present invention in order to obtain three different heater element samples by extrusion. In this connection the PTC material is used as the heater and the control while the amorphous conductive rubber interlayer serves to reduce contact resistance.

3. Insulating coating

The three separate heater element samples prepared as described above were each covered with an extruded insulating layer of TPR to give three different heater elements in dog-bone configuration.

4. Annealing

Each of the three heater elements was then subjected to annealing in a fluidised bed at 130° C.

Heater elements according to the present invention were also produced as described above but using the following formulations for the PTC materials:

| No. | Vestolen A5544 | Santovar A | Butyl 301 | Herchlor C | Ketjen EC | Vulcan P | Vulcan 3 |
|---|---|---|---|---|---|---|---|
| 4 | 100 | 5 | 30 | — | 4 | 11 | — |
| 5 | 100 | 5 | 30 | — | 4 | — | 14 |
| 6 | 100 | 5 | 30 | — | — | 22 | — |
| 7 | 100 | 5 | 40 | — | 4 | 12 | — |
| 8 | 100 | 5 | 40 | — | 4 | — | 15 |
| 9 | 100 | 5 | 40 | — | — | 24 | — |
| 10 | 100 | 2 | — | 30 | 4 | 8 | — |
| 11 | 100 | 2 | — | 30 | 4 | — | 10 |
| 12 | 100 | 2 | — | 30 | — | 16 | — |
| 13 | 100 | 2 | — | 40 | 4 | 7 | — |
| 14 | 100 | 2 | — | 40 | 4 | — | 9 |
| 15 | 100 | 2 | — | 40 | — | 14 | — |
| 16 | 100 | 2 | — | 40 | 3 | 11 | — |
| 17 | 100 | 2 | — | 40 | 3 | — | 14 |

We claim:

1. A flexible heating element which comprises at least two flexible electrical conductors spaced apart by a PTC material, an amorphous highly conductive rubber compatible with the said PTC material and adhered to and completely surrounding each conductor, said conductive rubber being interposed between the PTC material and each conductor whereby in use current passes from one conductor to another through the PTC material via the said highly conductive rubber, said conductors and said conductive rubber which coats said conductors being completely enveloped by said PTC material, the conductors being spaced sufficiently close to one another to ensure that when energized the PTC material heats substantially uniformly without exhibiting a significant temperature gradient between the conductors and that any abnormal temperature increase increases the temperature of all the PTC material between the conductors in the region of the abnormal temperature increase, the amorphous highly conductive rubber interposed therebetween providing improved current conduction between the conductors and said PTC material.

2. A heating element as claimed in claim 1 wherein the PTC material comprises high density polyethylene.

3. A heating element as claimed in claim 1 wherein the amorphous highly conductive rubber comprises an epichlorohydrin rubber.

4. A heating element as claimed in claim 3 wherein the amorphous highly conductive rubber contains about 65% epichlorohydrin rubber and about 35% ethylene oxide.

5. A heating element as claimed in claim 1 wherein a layer of graphite is interposed between the amorphous highly conductive rubber and the conductor.

6. A heating element as claimed in claim 1, said element having a substantially dumb-bell shaped cross section having two lobe portions, each said flexible electrical conductor being spiralled around a core of electrically insulating material and one of said flexible electrical conductors being positioned in each of said lobe portions of the dumb-bell.

7. A heating element as claimed in claim 6 wherein one of said flexible electrical conductors is spiralled around one core of electrically insulating material in one direction in one of said lobe portions and the other flexible electrical conductor is spiralled around the other core in the opposite direction in the other of said lobe portions.

* * * * *

UNITED STATES PATENT AND TRADEMARK OFFICE
CERTIFICATE OF CORRECTION

PATENT NO. : 4,348,584

DATED : September 7, 1982

INVENTOR(S) : George M. Gale, David I. James, John V. B. Meyer

It is certified that error appears in the above-identified patent and that said Letters Patent is hereby corrected as shown below:

Column 3, line 32, "preferably" should be --preferable--

Column 3, line 51, "beween" should be --between--

FIG. 2, should appear as shown on the attached sheet.

Signed and Sealed this

Twelfth Day of July 1983

[SEAL]

Attest:

GERALD J. MOSSINGHOFF

Attesting Officer

Commissioner of Patents and Trademarks